(12) United States Patent
Houten et al.

(10) Patent No.: US 6,860,355 B2
(45) Date of Patent: *Mar. 1, 2005

(54) VEHICLE TRANSMISSION SHIFT SAFETY SYSTEM

(76) Inventors: Ronald Van Houten, 17 John Brenton Dr., Dartmouth (CA), B2X 2V5; J. E. Louis Malenfant, Box 5221, Shediac, New Brunswick (CA), E4P 8T9

(*) Notice: Subject to any disclaimer, the term of this patent is extended or adjusted under 35 U.S.C. 154(b) by 107 days.

This patent is subject to a terminal disclaimer.

(21) Appl. No.: 10/356,049

(22) Filed: Jan. 31, 2003

(65) Prior Publication Data

US 2003/0111286 A1 Jun. 19, 2003

Related U.S. Application Data

(63) Continuation-in-part of application No. 09/708,329, filed on Nov. 8, 2000, now Pat. No. 6,533,057.

(51) Int. Cl.[7] .............................................. B60R 21/00
(52) U.S. Cl. .................................... 180/269; 340/457.1
(58) Field of Search ................................. 180/268, 269, 180/270, 271; 340/457.1; 70/248, 245; 74/473.21, 473.23; 701/45

(56) References Cited

U.S. PATENT DOCUMENTS

| | | | |
|---|---|---|---|
| 3,133,277 A | 5/1964 | Hood | 340/278 |
| 3,368,197 A | 2/1968 | Lemon | 340/52 |
| 3,449,714 A | 6/1969 | Farley, Jr. | 340/52 |
| 3,462,732 A * | 8/1969 | Griffin | 180/270 |
| 3,693,147 A | 9/1972 | Seo et al. | 340/52 |
| 3,737,850 A | 6/1973 | Kopp | 340/52 |
| 3,740,711 A | 6/1973 | Bell | 340/52 |
| 3,742,448 A | 6/1973 | Motz | 340/52 |
| 3,748,640 A | 7/1973 | Sardo, Jr. | 340/52 |
| 3,777,175 A | 12/1973 | Lewis et al. | 307/10 |
| 3,787,804 A * | 1/1974 | MacDonald | 180/268 |
| 3,808,592 A | 4/1974 | Wright | 340/52 |
| 3,859,625 A | 1/1975 | Eggert, Jr. | 340/52 |
| 3,860,904 A | 1/1975 | Andersen | 340/52 |
| 3,863,209 A | 1/1975 | Hollins | 340/52 |
| 3,864,668 A | 2/1975 | Bickford | 340/52 |
| 3,866,167 A | 2/1975 | Hirano | 340/52 |
| 3,870,120 A | 3/1975 | Blinkilde | 180/82 |
| 3,902,074 A | 8/1975 | Uota | 307/10 |
| 3,906,441 A | 9/1975 | Andersen et al. | 340/52 |
| 3,934,671 A | 1/1976 | Hart | 180/82 |
| 3,935,470 A | 1/1976 | Cake | 307/105 |
| 3,948,339 A | 4/1976 | Iwanaga | 180/82 |
| 3,958,658 A | 5/1976 | Miyauchi et al. | 180/82 |
| 3,960,235 A * | 6/1976 | Iijima | 180/269 |
| 3,977,488 A | 8/1976 | Kameyama | 180/82 |
| 3,987,864 A * | 10/1976 | Iijima et al. | 180/269 |
| 4,107,645 A | 8/1978 | Lewis et al. | 340/52 |
| 4,197,919 A | 4/1980 | Redmond | 180/269 |
| 4,785,906 A | 11/1988 | Kang | 180/270 |
| 5,133,425 A | 7/1992 | Han | 180/270 |
| 5,394,955 A | 3/1995 | Howard | 180/723 |
| 5,596,312 A | 1/1997 | Fowler et al. | 340/457.1 |
| 5,760,684 A | 6/1998 | Orbach | 340/457.1 |
| 5,941,337 A | 8/1999 | Castellanos et al. | 180/287 |
| 6,278,358 B1 | 8/2001 | Spoto et al. | 340/425.5 |
| 6,300,869 B1 | 10/2001 | White et al. | 340/457 |

* cited by examiner

*Primary Examiner*—David R. Dunn
(74) *Attorney, Agent, or Firm*—Howard & Howard

(57) ABSTRACT

The invention discloses an assembly and method of controlling the use of an automobile while encouraging the use of occupant restraints (12). The assembly consists of an actuator (16) that blocks the movement of the shift mechanism (10) until occupant restraint sensors (14) detect the occupant restraints (12) in the fastened positions or the expiration of the predetermined time. The length of the predetermined time must be long enough to frustrate the operator to fasten the occupant restraint (12). The predetermined time of blocking may be zero after the a pattern of consistent fastening of the restraint is established, with the blocking being reinstated if the pattern is broken by an unfastened restraint.

14 Claims, 3 Drawing Sheets

VEHICLE TRANSMISSION SHIFT SAFETY SYSTEM

RELATED APPLICATION

This application is a continuation-in-part of application Ser. No. 09/708,329 filed Nov. 8, 2000, now U.S. Pat. No. 6,533,057.

BACKGROUND OF THE INVENTION

1. Field of the Invention

An assembly and method for controlling the use of an automotive vehicle while encouraging the use of occupant restraints.

2. Description of the Prior Art

Various assemblies are well known in the prior art that prevent the use of an automotive vehicle unless the occupant restraints are engaged. An example of such a device is disclosed in the U.S. Pat. No. 3,859,625 to Eggert, Jr.

The Eggert patent discloses an interlock seatbelt system for a vehicle. The arrangement includes a gear selector, a selector switch, a pin, an ignition switch, and a plurality of seat belt switches. When the operator sits on the seat, the engine can be started without regard to the seat belt switches. However, when the operator shifts from park or neutral, the switches open and close. The opening and closing of the switches energizes a relay that actuates the pin. The pin extends and engages a notch of the gear selector preventing the operator from shifting. Once the operator has fastened his seatbelt, the relay is de-energized and the pin disengages from the gear selector. The vehicle can be operated normally after the operator has fastened his seatbelt. Additional sensors may be positioned in the passenger seats and they operate in the same fashion as described above.

The prior art safety devices show a seatbelt and gear interlock that prevents the shifting of the vehicle if the seatbelt is not fastened. They require that the seatbelts be fastened in all occupied positions before shifting the vehicle. This method is very limiting and intrusive on the personal choices of the operator and passengers. There remains an opportunity to continue to encourage use of the seatbelts while recognizing the choice of the operator or passengers to operate the vehicle without using his or her seatbelt.

SUMMARY OF THE INVENTION AND ADVANTAGES

The invention provides a vehicle assembly comprising a transmission having a plurality of shift positions and an occupant restraint, having a fastened position and an unfastened position An actuator is movable to and from a blocked position for preventing the shifting of the transmission between shift positions in response to the occupant restraint being in the unfastened position. The assembly is characterized by a microprocessor for monitoring the fastening of the occupant restraint to establish a fastening frequency and for blocking the shifting in response to the fastening frequency being below a predetermined value.

The subject invention also provides a method of controlling the use of an automotive vehicle having a brake pedal, an engine, a transmission with a plurality of shift positions and a restraint for an operator movable between an unfastened and a fastened position. The method comprises the steps of initiating operation of the engine, depressing the brake pedal, shifting the transmission between shift positions, and blocking the shifting until the restraint is in the fastened position. The method is characterized by monitoring the fastening of the occupant restraint to the fastened position to establish a rate of restraint use and blocking the shifting until the rate of restraint use is above a predetermined level.

Accordingly, an assembly and a method are provided that encourage the use of seatbelts while allowing for personal choices of the operator and passengers. The use of a delay often alters the behaviors of busy people. The subject invention frustrates the operator with the delay of operating the vehicle. To avoid the frustration and wait, the operator simply fastens the seatbelt and is then able to operate the vehicle. However, the subject invention does not require that the seatbelt be fastened to operate the vehicle when the seat belt is regularly fastened at some point during the operation of the vehicle. The system learns that the operator is reliable in that the operator regularly fastens the seat belt and does not block the shifting at all. However, should the operator fail to fasten the seat belt during operation of the vehicle or within a predetermined time of vehicle operation, the shifting delay will be reinstated for the next operation of the vehicle. An advantage of the invention is that it allows a vehicle operator who regularly fastens the seat belt to shift and operate the vehicle in an emergency situation where time is of the essence.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
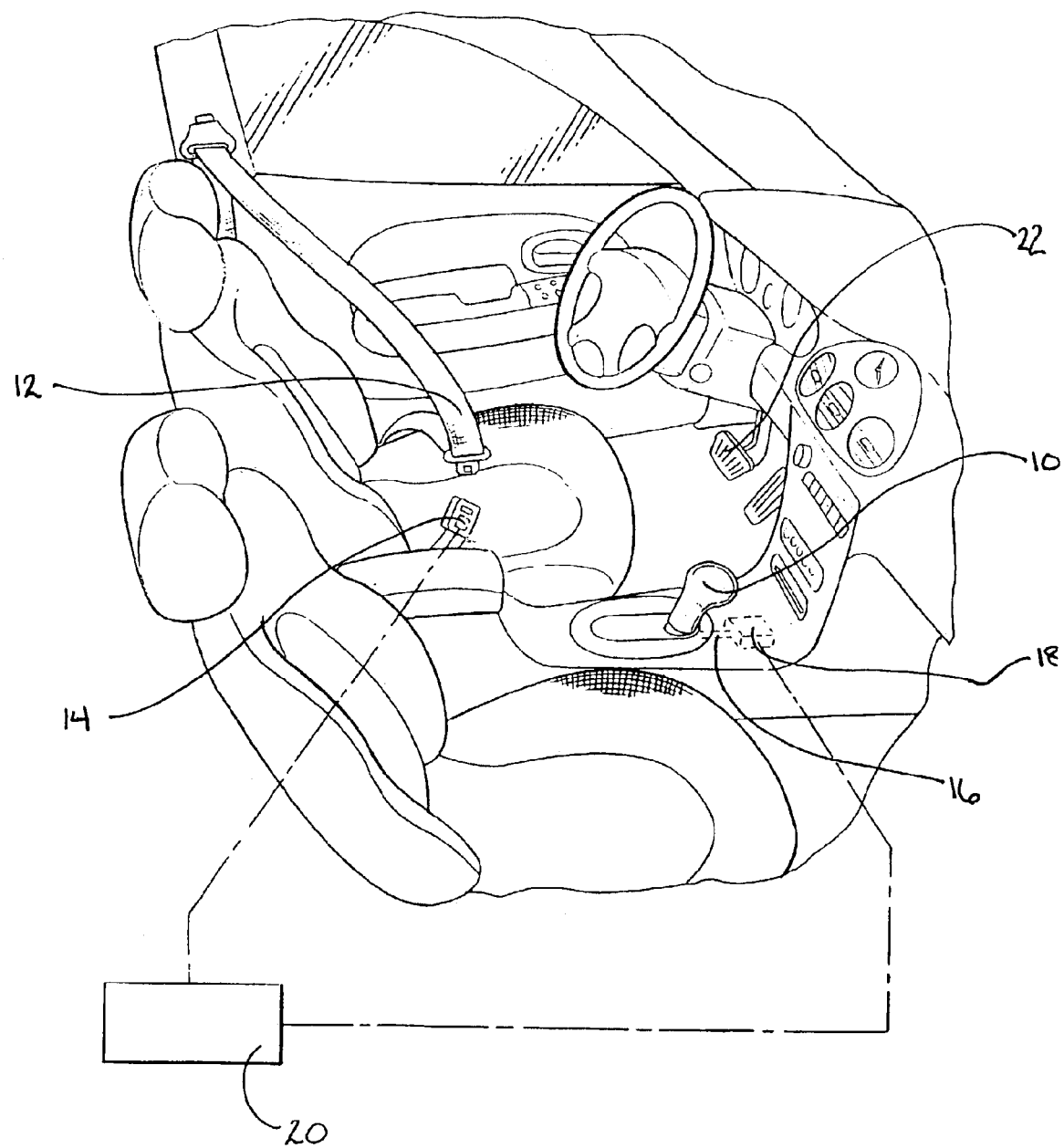
FIG. 1 is perspective view of an interior of an automotive vehicle showing the components of the subject invention.

Referring to the Figures, wherein like numerals indicate like or corresponding parts throughout the several views, the subject invention includes an assembly and a method for controlling the use of an automotive vehicle while promoting the use of occupant restraints. The components of the assembly are shown in FIG. 1. The assembly consists of a transmission with a plurality of shift positions. Such shift positions include park, reverse, neutral and drive. A shift mechanism 10 is used to shift the transmission between the plurality of shift positions. The assembly also consists of an occupant restraint 12 and an occupant restraint sensor 14. The occupant restraint sensor 14 detects if the occupant restraint 12 is in a fastened or unfastened position. An actuator 16 is included in the assembly for blocking the movement of the shift mechanism 10 and preventing the shifting of the transmission. The actuator 16 is moveable to and from the blocked position. The assembly uses a switch 18 to move the actuator 16 to and from the blocked position. The switch 18 moves the actuator 16 to a blocked position in response to the occupant restraint sensor 14 detecting the occupant restraint 12 in the unfastened position.

The assembly is characterized by a timer 20. The timer 20 is also responsive to the occupant restraint sensor 14 detecting that the occupant restraint 12 is in the unfastened position. The switch 18 moves the actuator 16 from the blocked position when the predetermined time of the timer 20 expires. The switch 18 also moves the actuator from the blocked position when the occupant restraint sensor 14 detects the occupant restraint 12 in the fastened position.

The subject invention also includes an alarm. The alarm can provide information in any format, i.e. visual, audible, etc. The purpose of the alarm is to notify the operator of the vehicle that the shift safety system is engaged. The alarm will trigger when the actuator 16 is blocking the shift mechanism 10 and the occupant restraint 12 is in the unfastened position. The alarm notifies the operator that the delay is in progress and to fasten the occupant restraint 12. The alarm will cease at either the expiration of the predetermined time or when the occupant restraint 12 is in the fastened position.

Figure 2:
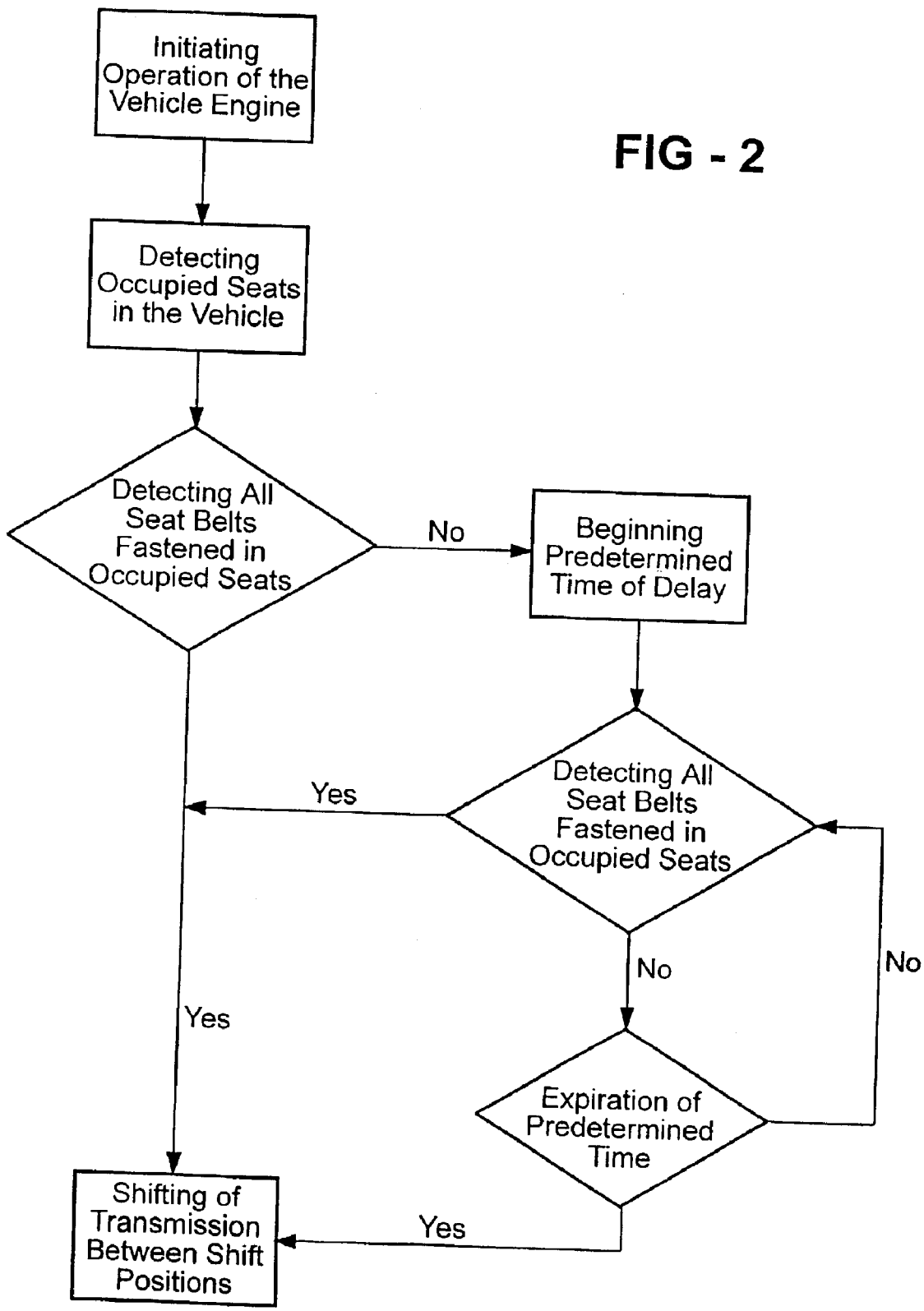
FIG. 2 is a schematic diagram of the steps of the method in one embodiment.
Figure 3:
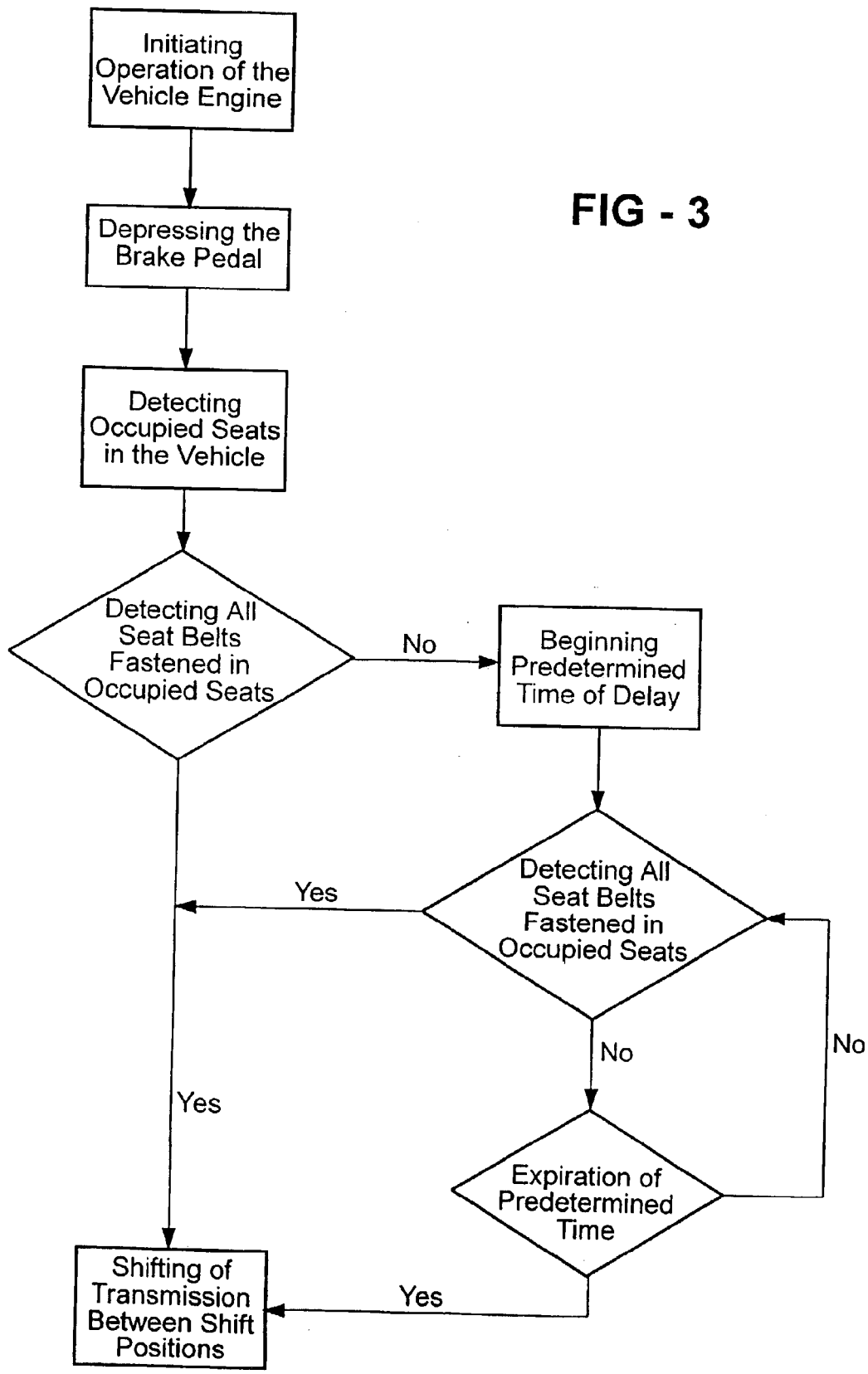
FIG. 3 is a schematic diagram of the steps of the method in a second embodiment.

The assembly may also utilize a microprocessor including various of the components and/or functions illustrated in FIGS. 2 and 3. The microprocessor would be programmed with a predetermined success rate. The predetermined success rate would be the number of times that the subject invention was successful in encouraging the operator to fasten the occupant restraint 12 before the expiration of the predetermined time. The microprocessor would monitor a fastening frequency and an initiation frequency. The fastening frequency is the number of times that the occupant restraint 12 was fastened prior to the expiration of the predetermined time. The initiation frequency is the number of times that the vehicle engine was started. The fastening frequency and the initiation frequency would be continually monitored over a period of time such as weeks or months. The microprocessor would then compare the fastening frequency to the initiation frequency to produce a success rate. The microprocessor could simply monitor a fastening frequency of fastening the occupant restraint after initiating operation of the vehicle and remove the blocking of the shifting in response to the fastening frequency of the occupant restraint 12 being above a predetermined value or level. For example, if the operator fastened the restraint 12 a predetermined number of times to establish a rate of restraint use, the next initiation of vehicle use would be free of the blocking function until the operator fails to fasten the restraint, in which case the blocking function would be reinstated, i.e., after the fastening rates falls below a predetermined value, a predetermined value that may be the same or different from the predefined value for removing the blocking. The initial blocking may be accomplished with or without a limit upon the time the blocking remains in effect, i.e., the blocking may occur until the restraint is fastened but removed after the predetermined fastening frequency reaches a predetermined value or level. On the other hand, the monitoring of the fastening of the occupant restraint may be prior to expiration of the predetermined time to establish the fastening frequency, followed by the discontinuance of the blocking of the shifting in response to the fastening frequency of the occupant restraint 12 being above a first predetermined value. In any case, the blocking may be reinstated in response to the fastening frequency falling below a second predetermined value, again, the second predetermined value may be the same or different form the first predetermined value. In its purest form the microprocessor merely monitors the fastening of the restraint to establish a rate of restraint use and blocks the shifting of the transmission when the rate of restraint use falls below a predetermined minimum standard. The blocking may never occur so long as the restraint is continually fastened sometime during vehicle operation, but will occur the next time the vehicle is operated in the event the restraint is not fastened during the preceding vehicle operation cycle. To accomplish this, the microprocessor moves the actuator to the blocked position in response to the occupant restraint 12 being in the unfastened position and monitors the fastening frequency of the occupant restraint 12 being in the fastened position to retain the actuator out of the blocked position in response to the fastening frequency being above a predetermined value. Said another way, the microprocessor may monitor the fastening of the occupant restraint 12 to establish a fastening frequency and blocks the shifting in response to the fastening frequency being below a first predetermined value. The microprocessor includes a timer for blocking the shifting for a predetermined time in response to the occupant restraint 12 being in the unfastened position. The microprocessor includes a reinstating portion for reinstating the blocking of the shifting in response to the rate of restraint use falling below a second predetermined level.

The success rate is compared to the predetermined success rate developed earlier. In response to the predetermined success rate matching or exceeding the calculated success rate, the microprocessor would then adjust the length of the predetermined time.

As an example, if the microprocessor monitored and calculated that the success rate is twenty percent (20%), then the assembly is not frustrating the operator into fastening the occupant restraint 12. The operator is allowing the predetermined time to expire before fastening the occupant restraint 12 eighty percent (80%) of the time. The microprocessor would then compare the success rate to the predetermined success rate, for example, seventy-five percent (75%). Since, in this example, the success rate, twenty percent (20%), is less than the predetermined success rate of seventy-five percent (75%), the microprocessor would increase the length of the predetermined time to further frustrate the operator and encourage use of the occupant restraint 12. Once the occupant restraint 12 was being fastened before the expiration of the predetermined time and the success rate was increasing, the microprocessor could decrease the length of the predetermined time because the operator had developed the habit of fastening the occupant restraint 12. The microprocessor could be used to control a variety of different functions and should not be limited to the example described above.

The use of the assembly is better understood with a description of the method. Alternative sequences of the method steps are shown in FIGS. 2 and 3. The method begins with an operator initiating operation of a vehicle engine. Once the engine is started, an occupant restraint sensor 14 detects whether the occupant restraint 12 is in the fastened or unfastened position. The next step is for the operator to shift the transmission to one of a plurality of shift positions such as reverse or drive. Initially the shift mechanism 10 would be in the park position and the switch 18 would have the actuator 16 in the blocked position. The operator would depress a brake pedal 22 and attempt to move the shift mechanism 10 to a position other than the park position. If the occupant restraint sensor 14 detects that the occupant restraint 12 is in the fastened position, then the switch 18 moves the actuator 16 from the blocked position. Hence, the shift mechanism 10 will move freely to the desired shift position. However, if the occupant restraint sensor 14 detects that the occupant restraint 12 is in the unfastened position, then the switch 18 will not move the actuator 16 from the blocked position. Instead, a predetermined time begins and ends at expiration.

An alternative embodiment of the subject invention could block the shifting of only selected shift positions. An example would be blocking the shift positions of all drive gear positions, but allowing the shift mechanism 10 to move freely to shift positions such as reverse or neutral. This alternative to blocking all of the shift positions would provide manufacturers and operators a greater amount of choices while encouraging the use of occupant restraints 12.

The method is characterized by not moving the actuator 16 from the blocked position until the expiration of a predetermined time. Once the predetermined time has expired, the switch 18 moves the actuator 16 from the blocked position and the operator is able to move the shift mechanism 10 to the desired shift position. The predetermined time continues only while the occupant restraint sensor 14 detects that the occupant restraint 12 is in the unfastened position. If, during the predetermined time, the occupant fastens the occupant restraint 12, then the switch 18 moves the actuator 16 from the blocked position. The actuator 16 is only in the blocked position while the occupant restraint 12 is in the unfastened position or until the expiration of the predetermined time.

The start of the predetermined time can begin at various steps of the method. One possible starting point is when the operator initiates the engine. If the occupant restraint 12 is in the unfastened position then the predetermined time begins to expire once the engine is started. An alternative starting point is once the operator depresses the brake pedal 22. If the occupant restraint 12 is in the unfastened position then the predetermined time begins to expire once the brake pedal 22 is depressed. The length of time for depression of the brake pedal 22 can vary. The subject invention could require just a tap of the brake pedal to holding the brake pedal for several seconds for triggering the beginning of the predetermined time.

The length of the predetermined time is dependent upon a variety of factors. The objective of the subject invention is for the predetermined time to be long enough to frustrate the operator. To avoid the frustration, the operator will fasten the occupant restraint 12. One factor for determining the length of the predetermined time is at which step the predetermined time begins. The predetermined time would need to be longer if it was started along with initiation of the engine than with depression of the brake pedal. Often an operator initiates operation of the engine but performs other tasks before driving the vehicle. The predetermined time would need to be long enough to still frustrate the operator if the occupant restraint is in the unfastened position once the operator chooses to finally drive the vehicle. The predetermined time would be shorter if it was started along with the depression of the brake pedal. Often, shifting the transmission from the park position is one of the last steps before the operator begins to drive the vehicle. Therefore, the length of time needed to frustrate the operator would be less. Eventually, if the length of the predetermined time is set correctly, then the operator will choose to avoid the frustration of waiting to drive the vehicle and fasten the occupant restraint 12.

Other factors, such as occupant location, can also affect the length of the predetermined time. As alluded to above, the predetermined time of blocking may be a zero amount of time from initiation of vehicle operation in the event the monitoring establishes a predetermined rate of restraint use indicating that the restraint will be fastened during each operation of the vehicle, but with the predetermined period of time being reinstated in the event the seat belt is not fastened during a vehicle use, i.e., the reliability factor is broken.

Research indicates that a number of vehicle operators do not fasten the seat belt until after shifting the transmission, or even after placing the vehicle in motion. The subject invention is transparent to such operators. In order to achieve this transparency, the microprocessor initiates the blocking of the shifting for a predetermined period only if it detects a pattern of non-seat belt use. Operators who fasten the seat belt after shifting and/or placing the vehicle in motion would escape the system, i.e., the blocking of the shifting. However, if the seat belt is not fastened within a predetermined time, for a specified or predetermined number of occasions, the vehicle operation would be scored as a non-use and the predetermined time of blocking would go back into effect for the initiation of the next vehicle operation. Once the system is active to provide the predetermined time of blocking, a pattern of consistent seat belt use by fastening would be required to place the system in the standby mode wherein the there would be no blocking of the shifting. Accordingly, in accordance with this invention, short journeys or periods of use would escape because the timer would not time out, e.g., moving the vehicle in a driveway.

The subject invention also includes detecting the presence of an occupant in one of a plurality of vehicle positions. An occupant detector can determine which positions in the vehicle are occupied, i.e. driver's seat, passenger's seat, backseat. The occupant detector can also detect the weight of the occupant in each occupied vehicle positions. Adjustments to the length of the predetermined time can be made based upon which vehicle positions are occupied and the weight of the passengers. Often, lightweight passengers in the backseat vehicle positions are small children. The length of the predetermined time may be increased to allow more time for the operator to encourage the children to fasten the occupant restraints. Various combinations of occupied vehicle positions and passenger weights will produce different lengths in the predetermined time.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A method of controlling the use of an automotive vehicle having a brake pedal (22), an engine, a transmission with a plurality of shift positions and an occupant restraint (12) for an operator movable between an unfastened position and a fastened position, said method comprising the steps of:

initiating operation of the vehicle, blocking the shifting of the transmission between shift positions in response to the occupant restraint being in the unfastened position, monitoring a fastening frequency of fastening the occupant restraint after initiating operation of the vehicle, and removing the blocking of the shifting in response to the fastening frequency of the occupant restraint (12) being above a predetermined value.

2. A method of controlling the use of an automotive vehicle having a brake pedal (22), an engine, a transmission with a plurality of shift positions and an occupant restraint (12) for an operator movable between an unfastened position and a fastened position, said method comprising the steps of:

initiating operation of the engine, depressing the brake pedal (22), blocking the shifting of the transmission between shift positions for a predetermined time in response to the occupant restraint (12) being in the unfastened position, monitoring the fastening of the occupant restraint prior to expiration of the predetermined time to establish a fastening frequency, and discontinuing the blocking of the shifting in response to the fastening frequency of the occupant restraint (12) being above a first predetermined value.

3. A method as set forth in claim 2 including the step of reinstating the blocking in response to the fastening frequency falling below a second predetermined value.

4. A method of controlling the use of an automotive vehicle having a brake pedal (22), an engine, a transmission with a plurality of shift positions and an occupant restraint (12) for an operator movable between an unfastened position and a fastened position, said method comprising the steps of:

(a) initiating operation of the engine, (b) depressing the brake pedal (22), (c) shifting the transmission between shift positions, (d) monitoring the fastening of the occupant restraint to the fastened position to establish a frequency of restraint use in response to an operation signal from any one of and any combination of the above steps (a) (b) and (c), subsequently blocking the shifting for a predetermined time in response to a subsequent operation signal until the frequency of restraint use is above a predetermined level.

5. A method as set forth in claim 4 including blocking the shifting for a predetermined time in response to the occupant restraint (12) being in the unfastened position.

6. A method as set forth in claim 4 further defined as removing the blocking of the shifting in response to the frequency of restraint use being above the predetermined level.

7. A vehicle assembly comprising:

a transmission having a plurality of shift positions, an occupant restraint (12) having a fastened position and unfastened position, an actuator (16) movable to and from a blocked position for blocking the shifting of the transmission between shift positions, said assembly characterized by a microprocessor for moving said actuator to said blocked position in response to said occupant restraint (12) being in said unfastened position and for monitoring a fastening frequency of the occupant restraint (12) being in said fastened position to retain the actuator out of said blocked position in response to said fastening frequency being above a predetermined value.

8. A vehicle assembly comprising:

a transmission having a plurality of shift positions, an occupant restraint (12) having a fastened position and unfastened position, an actuator (16) movable to and from a blocked position for blocking the shifting of the transmission between shift positions for a predetermined time in response to the occupant restraint (12) being in the unfastened position, said assembly characterized by a microprocessor for monitoring the fastening of the occupant restraint (12) prior to the expiration of the predetermined time to establish a fastening frequency and discontinuing the blocking of the shifting in response to the fastening frequency being above a first predetermined value.

9. An assembly as set forth in claim 8 wherein said microprocessor includes a reinstating portion for reinstating the blocking in response to the fastening frequency falling below a second predetermined value.

10. A vehicle assembly comprising:

a transmission having a plurality of shift positions, an occupant restraint (12) having a fastened position and unfastened position, an actuator (16) movable to and from a blocked position for preventing the shifting of the transmission between shift positions in response to the occupant restraint (12) being in the unfastened position, said assembly characterized by a microprocessor for monitoring the fastening of the occupant restraint (12) to establish a fastening frequency and for blocking the shifting in response to the fastening frequency being below a first predetermined value.

11. An assembly as set forth in claim 10 wherein said microprocessor includes a timer for blocking the shifting for a predetermined time in response to the occupant restraint (12) being in the unfastened position.

12. A method of controlling the use of an automotive vehicle having a brake pedal (22), an engine, a transmission with a plurality of shift positions and an occupant restraint (12) for an operator movable between an unfastened position and a fastened position, said method comprising the steps of:

initiating operation of the vehicle, monitoring a fastening frequency of fastening the occupant restraint for a predetermined time after initiating operation of the vehicle, and blocking the operation of the vehicle until the occupant restraint is fastened in response to the fastening frequency of the occupant restraint (12) being below a predetermined level.

13. A method as set forth in claim 12 wherein the blocking the operation of the vehicle is further defined as blocking of the shifting of the transmission.

14. A method as set forth in claim 12 including unblocking the operation of the vehicle in response to the frequency of restraint use moving back above the predetermined level.

* * * * *